United States Patent [19]

Ray et al.

[11] Patent Number: 5,884,166
[45] Date of Patent: Mar. 16, 1999

[54] MULTIDIMENSIONAL CELLULAR MOBILE TELECOMMUNICATION SYSTEM

[75] Inventors: J. C. Ray, Denison; Robert L. George, Plano; Geoffrey A. Hoppe, Bedford; Stephen S. Jones, Highland Village, all of Tex.; Daniel B. McKenna, Broomfield, Colo.

[73] Assignee: Aircell, Incorporated, Boulder, Colo.

[21] Appl. No.: 692,837

[22] Filed: Aug. 2, 1996

Related U.S. Application Data

[63] Continuation-in-part of Ser. No. 847,920, Mar. 6, 1992, Pat. No. 5,557,656.

[51] Int. Cl.$^6$ ................................................. H04Q 7/00
[52] U.S. Cl. .................. 455/431; 455/422; 455/426; 455/443; 455/454; 343/833; 343/893; 343/879
[58] Field of Search ................................. 455/431, 426, 455/422, 434, 436, 443, 444, 446–448, 517, 524, 561–562, 25, 7; 343/874–875, 879, 890–891, 893, 912, 833

[56] References Cited

U.S. PATENT DOCUMENTS

| | | |
|---|---|---|
| 3,030,509 | 4/1962 | Carlson . |
| 3,555,552 | 1/1971 | Alford . |
| 4,249,181 | 2/1981 | Lee . |
| 4,419,766 | 12/1983 | Goeken et al. . |
| 4,509,053 | 4/1985 | Robin et al. . |
| 4,595,928 | 6/1986 | Wingard . |
| 4,747,160 | 5/1988 | Bossard . |
| 4,868,577 | 9/1989 | Wingard . |
| 4,979,170 | 12/1990 | Gilhousen et al. . |
| 5,067,172 | 11/1991 | Schloemer . |
| 5,121,128 | 6/1992 | van Lidth de Jeude et al. . |
| 5,123,112 | 6/1992 | Choate . |
| 5,189,734 | 2/1993 | Bailey et al. . |
| 5,204,970 | 4/1993 | Stengel et al. . |
| 5,212,804 | 5/1993 | Choate . |
| 5,214,789 | 5/1993 | George . |
| 5,235,633 | 8/1993 | Dennison et al. . |
| 5,251,249 | 10/1993 | Allen et al. .............................. 455/422 |
| 5,444,762 | 8/1995 | Frey et al. . |
| 5,519,761 | 5/1996 | Gilhousen . |
| 5,557,656 | 9/1996 | Ray et al. . |
| 5,559,865 | 9/1996 | Gilhousen . |

FOREIGN PATENT DOCUMENTS

| | | |
|---|---|---|
| 2216319 | 10/1989 | United Kingdom . |
| WO 96/02094 | 1/1996 | WIPO . |

OTHER PUBLICATIONS

Nov. 13–15, 1991 E. Berruto et al., "Terrestrial Flight Telephone System For Aeronautical Public Correspondence: Overview And Handover Performance", MRC Mobile Radio Conference, pp. 221–228.

Oct. 1994 A. Demars et al., "Le Telephone Dans L'Avion", Navigation, vol. 42, No. 168, pp. 408–419.

Jul. 1, 1996 J. D. Pettifor et al., "An Overview of Aeronautical Telecommunications in Europe and World–Wide", BT Technology Journal, vol. 14, No. 3, pp. 64–73.

*Primary Examiner*—Doris H. To
*Attorney, Agent, or Firm*—Duft, Graziano & Forest, P.C.

[57] ABSTRACT

The multidimensional cellular mobile telecommunication system extends the usage of existing cellular mobile telecommunication radio frequencies allocated for ground-based communications to non-terrestrial mobile subscriber stations by adding an overlay of non-terrestrial cells of predetermined geometry and locus in space to the existing ground-based cellular cell site network. The polarization of the signals produced by the non-terrestrial antenna elements is a polarization that is different than and preferably substantially orthogonal to the polarization of the cellular radio signals produced by the ground-based antennas, such as a horizontal polarization, to thereby minimize the possibility of interference with the vertically polarized ground-based radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and cell site transmitter-receiver pairs, so that even if broadcasts from a non-terrestrial mobile subscriber station reach a ground-based mobile subscriber station or cell site receiver, they cannot be interpreted and are rejected out of hand.

25 Claims, 9 Drawing Sheets

MULTIDIMENSIONAL CELLULAR MOBILE TELECOMMUNICATION SYSTEM

CROSS-REFERENCE TO RELATED APPLICATIONS

This application is a continuation-in-part of U.S. patent application Ser. No. 07/847,920, filed Mar. 6, 1992 which is now U.S. Pat. No. 5,557,656 and titled "Mobile Telecommunications."

FIELD OF THE INVENTION

This invention relates to cellular communications and, in particular, to a cellular mobile telecommunication system that provides service to both terrestrial (ground-based) and non-terrestrial mobile subscriber stations using the same cellular telecommunication channels for both classes of users.

PROBLEM

It is a problem in the field of cellular mobile telecommunication services to provide customers with high quality communication services via a wireless communication medium. Existing cellular mobile telecommunication systems serve terrestrial (termed ground-based herein) mobile subscriber stations, but this service is not presently extensible to non-terrestrial mobile subscriber stations due to signal interference problems between ground-based and non-terrestrial mobile subscriber stations. The regulatory agencies responsible for telecommunications therefore presently do not permit the provision of such service.

Cellular mobile telecommunication systems provide the service of connecting mobile telecommunication customers, each having a mobile subscriber station, to both land-based customers who are served by the common carrier public telephone network as well as other mobile telecommunication customers. In such a system, all incoming and outgoing calls are routed through mobile telecommunication switching offices (MTSO), each of which is connected to a plurality of cell sites (base stations) which communicate with mobile subscriber stations located in the area covered by the cell sites. The mobile subscriber stations are served by the cell sites, each of which is located in one cell area of a larger service region. Each cell site in the service region is connected by a group of communication links to the mobile telecommunication switching office. Each cell site contains a group of radio transmitters and receivers with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station.

The first stage of a cellular communication connection is set up when a transmitter-receiver pair in a cell site, operating on a predetermined pair of radio frequencies, is turned on and a mobile subscriber station, located in the cell site, is tuned to the same pair of radio frequencies. The second stage of the communication connection is between the communication link connected to this transmitter-receiver pair and the common carrier public telephone network. This second stage of the communication connection is set up in the mobile telecommunication switching office, which is connected to the common carrier public telephone network by incoming and outgoing trunks. The mobile telecommunication switching office contains a switching network to switch mobile customer voice and/or data signals from the communication link to an incoming or outgoing trunk. The mobile telecommunication system is controlled by a mobile telecommunication controller at the mobile telecommunication switching office and a cell site controller at each cell site associated with the mobile telecommunication switching office. A plurality of data links connect the mobile telecommunication controller and the associated cell site controllers. The mobile telecommunication controller operates under control of complex software and controls the switching network. The mobile telecommunication controller also controls the actions of the associated cell site controllers by generating and interpreting the control messages that are exchanged with the associated cell site controllers over the data links. The cell site controllers at each cell site, in response to control messages from the mobile telecommunication controller, control the transmitter-receiver pairs at the cell site. The control processes at each cell site also control the tuning of the mobile subscriber stations to the selected radio frequencies.

Each cell in the ground-based cellular mobile telecommunication network comprises a predetermined volume of space radially arranged around the cell site transmitting antenna with the region of space roughly approximating a cylindrical volume having limited height. Since, all of the mobile subscriber stations are installed in ground-based units (such as motor vehicles) in traditional cellular mobile telecommunication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based mobile subscriber station initiates a call connection, control signals from the local cell site transmitter cause the frequency agile transponder in the ground-based mobile subscriber station to operate at the frequency of operation designated for that particular cell site. As the ground-based mobile subscriber station moves from one cell site to another, the call connection is handed off to the successive cell sites and the frequency agile transponder in the ground-based mobile subscriber station adjusts its frequency of operation to correspond to the frequency of operation of the transmitter located in the cell site in which the ground-based mobile subscriber station is presently operational.

This existing cellular mobile telecommunication system is presently in widespread use and has been designed to eliminate the problem of frequency overlap among adjacent cell sites and to minimize the number of frequencies required to serve vast areas without encountering the possibility of frequency overlap. These existing cellular mobile telecommunication systems, however, are inoperable when the user's mobile subscriber station is non-terrestrial in nature. In particular, the provision of cellular mobile telecommunication services to aircraft is inconsistent with the architecture of the existing ground-based cellular mobile telecommunication network since the antenna pattern of the existing ground-based cellular mobile telecommunication system broadcasts a signal in a pattern proximate to the ground and the pattern of frequency allocation for the pattern of cell sites is not extensible to aircraft. In particular, an antenna pattern that would be capable of serving a fast moving aircraft would have to cover a sufficient volume of space to minimize the number of station hand offs as the aircraft traverses one cell site after another. For the non-terrestrial mobile subscriber station to have an adequate sized cell site, that cell site would span a large number of the existing ground-based cell sites. Therefore, the existing pattern of frequency reuse would be disrupted and there presently is no frequency allocated or available for allocation to such purpose. If additional frequencies were allocated for non-terrestrial cellular telecommunication systems, all existing cellular telecommunication equipment would have to be redesigned to be capable of operating at these new frequencies and yet remain compatible with the existing pattern of cellular telecommunication services.

Thus, the existing cellular mobile telecommunication network is incapable of being simply extensible to provide service to non-terrestrial mobile subscriber stations and the architecture of choice installed in all ground-based cellular mobile telecommunication systems is fundamentally inoperable as it stands for use with non-terrestrial mobile subscriber stations. Therefore, the existing cellular mobile communication network is by its very nature simply a two dimensional ground-based system with the inability to be extensible beyond that limited definition. With this limitation, cellular mobile telecommunication services are completely unavailable for aircraft and aircraft must use a separate communication system that operates independent of the existing cellular mobile telecommunication network and which requires its own pattern of transceiver antennas, unique radio equipment and control software.

SOLUTION

The above described problems are solved and a technical advance achieved in the field by the multidimensional cellular mobile telecommunication system of the present invention. The multidimensional cellular mobile telecommunication system extends the usage of existing cellular mobile telecommunication frequencies allocated for ground-based cellular communications to non-terrestrial mobile subscriber stations in a manner that avoids the possibility of signal interference between the ground-based and non-terrestrial mobile subscriber stations. In particular, the multidimensional cellular mobile telecommunication system expands the two-dimensional adjacent cell configuration of the present day ground-based cellular telecommunication network by the addition of an overlay of non-terrestrial cells (coverage areas) of predetermined volume, each of which non-terrestrial cells can overlap numerous ground-based cells and which non-terrestrial cells are three-dimensional in nature. Each non-terrestrial cell in this overlay pattern is of predetermined geometry and locus in space and is preferably adjacent to other non-terrestrial cells so that a plurality of the adjacent non-terrestrial cells completely occupies a large volume of space in the region immediately adjacent to and overlying the existing ground-based cell network. In this manner, the overlay of non-terrestrial cells merges with the existing ground-based cells to form a seamless multidimensional cellular telecommunication network. There are a number of implementation features of this system which are cooperatively operative to enable the non-terrestrial cells and non-terrestrial mobile subscriber stations to operate in conjunction with the ground-based cells and ground-based mobile subscriber stations to provide superior communication performance. These features all function to reduce the possibility of interference between the non-terrestrial and ground-based elements in the resultant multidimensional network and the combination of these features which are used to implement a system is a function of the communication/control technology used for radio communication, the topography of the terrain, the communication traffic, the implementation cost of the system, and the like. Thus, a multidimensional cellular mobile telecommunication system can be implemented using only a subset of the implementation features described in the preferred embodiment of the present invention.

The existing mobile telecommunication switching office is partitionable via software to divide the physical area covered by the cells into two or more segments, one segment of which can optionally occupy the same volume of space as another segment. The multidimensional cellular telecommunication network of the present invention takes advantage of the partition capability of these systems to create a virtual cellular network which coexists with the existing cellular network and can integrate: multiple existing ground based cellular systems, different equipment, different vendors, different radio frequencies, can even be different technologies (digital/analog; TDMA/CDMA; AMPS/narrow band AMPS; FM/AM/PSK). The multidimensional cellular telecommunication network is seamless and overlaid on the existing ground-based cellular telecommunication network. In this system, the existing ground-based cell site transmitter/receiver antenna installations can be used for the non-terrestrial mobile subscriber stations by the addition of antenna elements and the creation of an antenna pattern which is insensitive to the reception of ground-originating or ground reflected signals and which antenna pattern is transmissive only in a skyward direction. In addition, the polarization of the signals produced by the non-terrestrial antenna elements is a polarization that is different than and preferably substantially orthogonal to the polarization of the ground-based cellular radio signals, such as a horizontal polarization, to thereby minimize the possibility of interference with the vertically polarized ground-based cellular radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and ground-based cell site transmitter-receiver pairs so that even if broadcasts from a non-terrestrial mobile subscriber station reach a ground-based mobile subscriber station or cell site transmitter-receiver pair they cannot be interpreted and are rejected out of hand. Optionally, the non-terrestrial system can switch uplink and downlink frequencies to be the opposite of ground-based mobile subscriber station pattern. In this manner, non-terrestrial cells can be created in the region of space adjacent to and overlying the existing ground-based cells and the existing cellular communication frequencies allocated for ground-based cellular telecommunications can be reused for non-terrestrial cellular telecommunications without the possibility of interaction between the existing ground-based cellular mobile telecommunication system and the non-terrestrial mobile subscriber stations. Furthermore, the transmit and receive frequencies for non-terrestrial communications can be offset from the ground-based frequencies. The non-terrestrial cells can be managed in a manner that is analogous to, yet separate from, the management of the ground-based cells so that hand offs from one non-terrestrial cell to another are managed independent of, but in a control manner similar to that used for the ground-based cells.

Thus, by reusing the presently allocated cellular radio frequencies and the control philosophies of the present day ground-based cellular mobile telecommunication systems, redesign of the existing equipment is minimized and the necessity for new apparatus is reduced to a minimum. To the mobile telecommunication switching office, the non-terrestrial cells all operate in harmony with the existing cell sites with no discernible differentiation among cells or stations, be they ground-based or non-terrestrial in nature. In this manner, the existing two dimension mobile cellular telecommunication network is extensible by use of these novel methods and apparatus to create a multidimensional cellular mobile telecommunication system which makes use of the presently allocated cellular radio frequencies and presently provided services.

DETAILED DESCRIPTION

The multidimensional cellular mobile telecommunication system of the present invention extends the usage of existing cellular mobile telecommunication radio frequencies allocated for ground-based communications to non-terrestrial mobile subscriber stations in a manner that avoids the possibility of signal interference between the ground-based and non-terrestrial mobile subscriber stations. In particular, the multidimensional cellular mobile telecommunication system adds an overlay of non-terrestrial cells of predetermined geometry and locus in space to the existing ground-based cellular mobile telecommunication network. The polarization of the cellular radio signals produced by the non-terrestrial antenna elements is a polarization that is different than and preferably substantially orthogonal to the polarization of the cellular radio signals produced by the ground-based antennas, such as a horizontal polarization, to thereby minimize the possibility of interference with the nominally vertically polarized ground-based cellular radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and cell site transmitter-receiver pairs, so that even if broadcasts from a non-terrestrial mobile subscriber station reach a ground-based mobile subscriber station or cell site receiver, they cannot be interpreted and are rejected out of hand.

Architecture of a Cellular Mobile Telecommunication System

Figure 1:
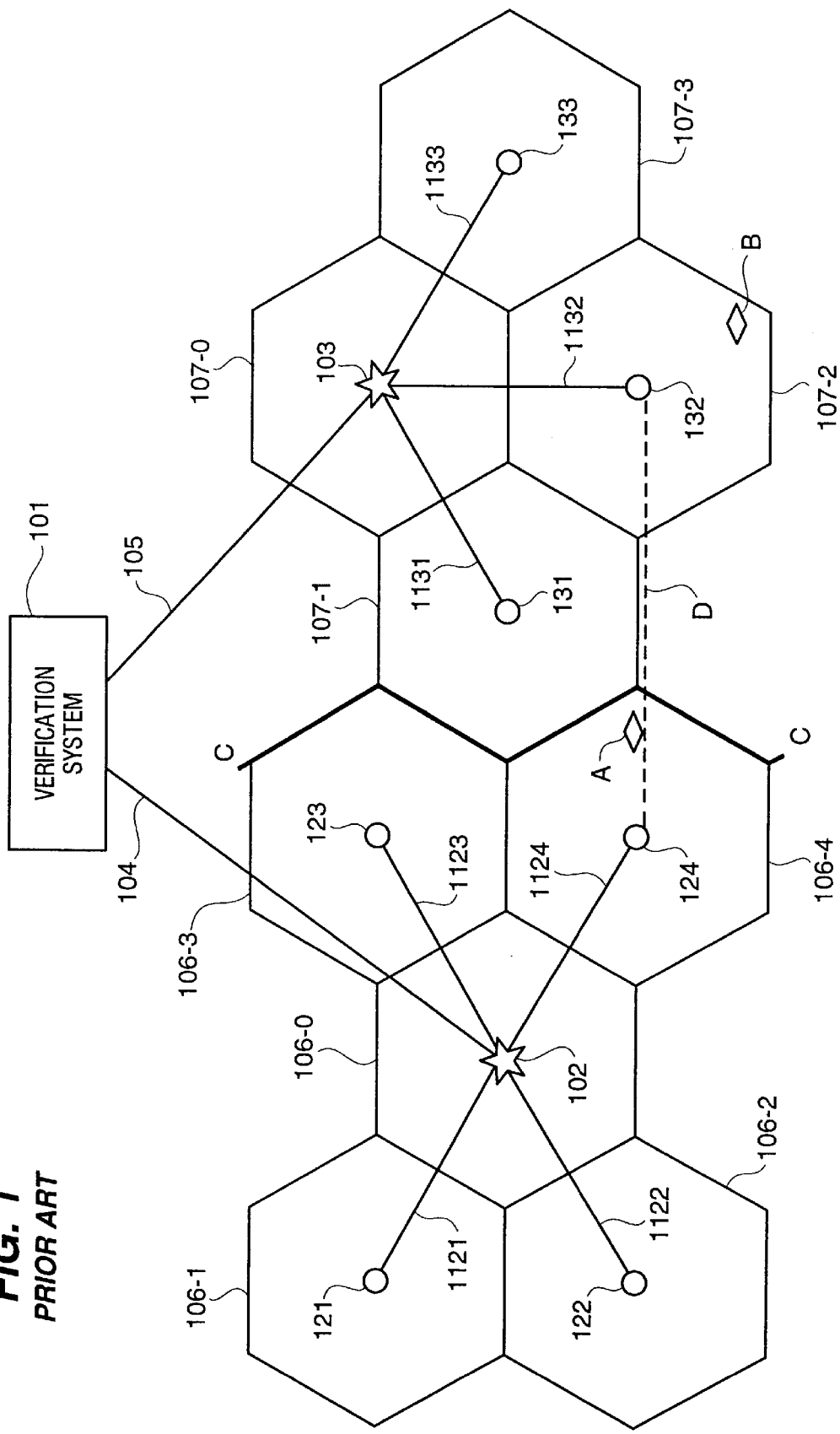
FIG. 1 illustrates a typical prior art ground-based cellular mobile telecommunication system that includes a plurality of mobile telephone switching offices.

FIG. 1 illustrates a typical prior art ground-based cellular mobile telecommunication system which includes a plurality of mobile telephone switching offices (MTSO) 102, 103, each of which is connected via communication facilities 1121–1124, 1131–1133 to a plurality of cell site transmitter-receiver pairs 121–124, 131–133 (also termed base stations herein). The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between subscriber stations and the transmitter-receiver pairs as well as the nature of the data transferred therebetween, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between subscriber stations located in the cells and the associated transmitter-receiver pairs located at the cell site for each of these cells.

For the purpose of illustration, two mobile subscriber stations A, B are shown in FIG. 1 and are located within cells 106, 107, respectively. A plurality of the cells 106 are interconnected with a designated mobile telecommunication switching office 102, which serves to interconnect the transmitter-receiver pairs 121–124 in the various cells 106 served by the mobile telecommunication switching office 102 with the public switched telephone network (PSTN) to access other mobile telecommunication switching offices as well as conventional telephone apparatus. The cellular mobile telecommunication system also includes a roamer verification system 101 which is interconnected with the mobile telecommunication switching offices 102, 103 via data links 104, 105, respectively. The roamer verification system 101 functions to authenticate the identity of the mobile subscriber stations A, B and authorize the provision of cellular telecommunication services to these subscribers.

The range of a particular cellular service is determined by the geographic location of the cells. In addition, cellular mobile telecommunication systems are not connected on a nationwide basis. Rather, the industry consists of many distinct geographical regions that serve a specific (home) base of subscribers. For example, in FIG. 1, the bold line C—C denotes a boundary between two cellular regions, with mobile telecommunication switching office 102 being located in a first of these regions and mobile telecommunication switching office 103 being located in a second adjacent region. When cellular subscribers leave their home geographical region, they become "roamers." When a roaming subscriber places a cellular telephone call from their mobile subscriber station, the mobile telephone switching office that provides service has no way of determining if this roamer is a valid subscriber or not, since this information is located in the roamer's home system. Obtaining the information from the home switch, and notifying the foreign mobile telecommunication switching office of the roamer's status is the purpose of the roamer verification system, illustrated in FIG. 1.

The cellular radio telecommunication service provided in North America, for example, is designed primarily for motor vehicles and other ground-based mobile subscriber stations. The system presently in use uses a plurality of radio frequency channels in the Ultra-High Frequency (UHF) band. A channel in this system comprises a pair of UHF frequencies in the designated band. One frequency in the channel is termed the "forward" carrier and is used for transmissions from the base station to the mobile subscriber station, while the other frequency in the pair is termed the "reverse" carrier and is used for transmissions from the mobile subscriber station to the base station. Present technologies in use include analog Frequency Modulation (FM) as the method for transmitting the signal with a 30 kHz frequency channel spacing. There is also digital transmission capability in some systems, wherein a plurality of signals are multiplexed on to the same carrier, with the 30 kHz spacing between adjacent bands. A total of 832 such channels are available for cellular telephone use, and these channels are located between the frequencies of 824 MHz to 849 MHz and 869 MHz to 894 MHz The transmitter has 832 communication channels, 790 voice/data communication and 42 control channels. This set of channels is divided into two subsets, each consisting of 21 control channels and an associated 395 voice/data channels. A first set of channels is typically termed the "A" side of the band and the remaining set of channels is typically termed the "B" side of the band. The 416 radio channels in each set of channels are divided into 21 control channels and 395 voice/data communication channels. The 395 voice/data communication channels are subdivided into seven groups of approximately 56 channels when used with a seven cell channel reuse plan, termed a K=7 plan.

Multidimensional Cellular System Control Channels

In this existing regulated communication environment, a particular problem is encountered when attempting to use cellular mobile telephone equipment from a non-terrestrial location, such as an aircraft. The elevated position of the mobile cellular telephone station when located aboard an aircraft causes the signal to be broadcast over a wide area of the surface of the earth, where it is received by many ground-based cell site transmitter-receiver pairs. In addition, the signal strength at a plurality of these ground-based cell site transmitter-receiver pairs may be substantially equal, making determination of the controlling base station a difficult choice. Thus, mobile cellular subscriber stations are prohibited from transmitting from aircraft. The cellular telephone network requires a minimum signal-to-noise ratio to enable the communications to be of an acceptable quality. The presently required separation between signal power level and the background or noise power level is typically approximately 6 dB for the non-terrestrial subscriber station and 18 dB for the cell-site receiver for interference free communications. Thus, the non-terrestrial cellular communication portion of the multidimensional system must provide adequate signal strength by the appropriate selection and siting of antenna elements within the constraints of available signal power. In addition, the interference between ground-based and non-terrestrial mobile subscriber stations must be obviated by the signal characteristics as well as communication control philosophy.

Figure 10:
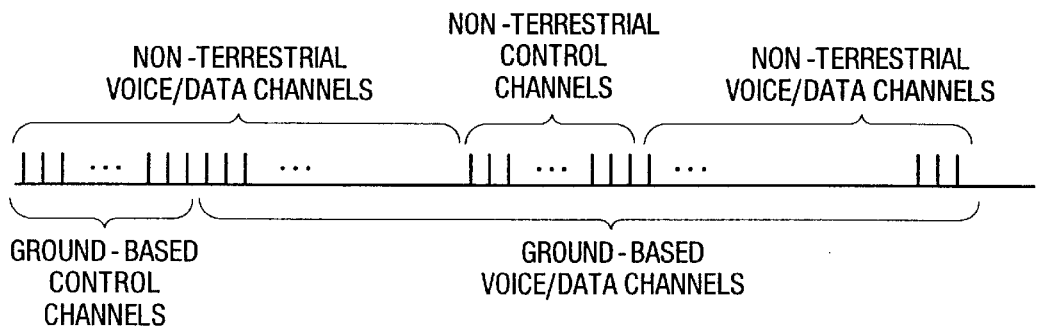
FIG. 10 illustrates the frequency allocation for a typical cell.

The communication control philosophy portion of this unique solution comprises a manipulation of the control channels such that control signals originated by a non-terrestrial mobile subscriber station cannot cause either a ground-based cell site receiver or ground-based mobile subscriber station receiver to receive and interpret these control signals. The reception of signals in the allocated frequency spectrum is beyond the practical control of the system, so the designation of control channels within the plurality of available channels represents the method of bifurcating the volume of space into two disjunct regions: ground-based and non-terrestrial. As shown in FIG. 10, the control channels dedicated for use by the non-terrestrial mobile subscriber stations are those which are designated as voice/data communication channels for the ground-based mobile subscriber stations. Thus, each ground-based cell site transceiver communicates with the ground-based mobile subscriber stations extant in its cell on predetermined control channels, which control channels are ignored by non-terrestrial mobile subscriber stations, since these channels are voice/data communication channels in the view of the non-terrestrial mobile subscriber stations. Similarly, each non-terrestrial cell site transmitter-receiver pair communicates with the non-terrestrial mobile subscriber stations extant in its cell on predetermined control channels, which control channels are ignored by ground-based mobile subscriber stations, since these channels are voice/data communication channels in the view of the ground-based mobile subscriber stations. Thus, the allocation of control channels in the non-terrestrial cells represents a paradigm shift with respect to the adjacent ground-based cells. This philosophy can be implemented in a cost effective manner, since the large installed base of ground-based mobile subscriber stations and ground-based cell site transmitter-receiver pairs inherently reject control signals transmitted in the voice/data communication channels. It is only the newly constructed non-terrestrial mobile subscriber stations and their associated cell site transmitter-receiver pairs which must be modified to reassign control channels. This implementation incurs a relatively small cost.

An alternative implementation of the communication control philosophy comprises allocating a subset of the available channels exclusively to non-terrestrial cellular communications, with this subset of dedicated channels being divided into control channels and communication channels as with the existing channel allocation pattern. However, the dedication of even a small number of channels can be problematic, since these channels are removed from all ground-based cells and can have significant impact on traffic handling capacity. In addition, such a solution requires the modification of all existing equipment.

Frequency Reuse Pattern

Mobile cellular telecommunication systems provide a plurality of concurrently active communications in the same service area, with the number of concurrently active communication connections exceeding the number of available radio channels. This is accomplished by reusing the channels via the provision of multiple base stations in the service area that is served by a single mobile telecommunication switching office. The overall service area of a mobile telecommunication switching office is divided into a plurality of "cells", each of which includes a base station and associated radio transmission tower, as shown in FIG. 1. The radius of the cell is basically the distance from the base station tower to the furthest locus at which good reception between the mobile subscriber station and the base station can be effected. The entire service area of a mobile telecommunication switching office is therefore covered by a plurality of adjacent cells. There is an industry standard cell pattern in which typically seven sets of channels are reused. Within a particular cell, the surrounding six cells are grouped in a circle around the first cell and the channels used in these six cells differ from the channels used in the particular cell and from each of the other six surrounding cells. Thus, the signals emanating from the radio transmission tower in the particular cell do not interfere with the signals emanating from the radio transmission towers located in each of the six surrounding cells because they are at different frequencies. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern of FIG. 1 is simply conceptual in nature and does not reflect the actual physical extent on the various cells, since the implemented cells are not hexagonal in configuration and do not have precisely delimited boundary edges.

The control channels that are available in this system are used to setup the communication connections between the mobile subscriber stations and the base station. When a call is initiated, the control channel is used to communicate between the mobile subscriber station involved in the call and the local serving base station. The control messages locate and identify the mobile subscriber station, determine the dialed number, and identify an available voice/data communication channel consisting of a pair of radio frequencies which is selected by the base station for the communication connection. The radio unit in the mobile subscriber station retunes the transmitter-receiver equipment contained therein to use these designated radio frequencies. Once the communication connection is established, the control messages are typically transmitted to adjust transmitter power and/or to change the transmission frequency when required to handoff this mobile subscriber station to an adjacent cell, when the subscriber moves from the present cell to one of the adjoining cells. The transmitter power of the mobile subscriber station is regulated since the magnitude of the signal received at the base station is a function of the transmitter power and the distance from the base station. Therefore, by scaling the transmitter power to correspond to the distance from the base station, the received signal magnitude can be maintained within a predetermined range of values to ensure accurate signal reception without interfering with other transmissions in the cell.

When a mobile unit approaches the boundary of a cell, the radio signal received at the base station is at a minimum level. Since the mobile unit is at the boundary of two cells, the signal power from the transmitter located in the adjacent cell is equal to or greater than the original cell and a handoff procedure is initiated. First, the cell base station initiates a mobile unit location process in the six adjoining cells. This is accomplished either by activation or continuous operation of a locating receiver in each of the six adjoining cells which tunes to the radio frequency and channel on which the mobile subscriber station is transmitting. The measured signal strength of this signal, as received at each of the six adjoining cells, is compared and the strongest signal is indicative of the cell which is to receive the handoff. If there is an available voice channel in that cell, the mobile subscriber station is sent a message on the control channel to re-tune its transmitter to the identified available voice channel at the transmitter frequency of the selected cell. Simultaneously, the voice connection is switched at the base stations from one cell to the next via the Mobile Telecommunication Switching Office to provide uninterrupted service.

Multidimensional Cellular Mobile Telecommunication Network

Figure 2:
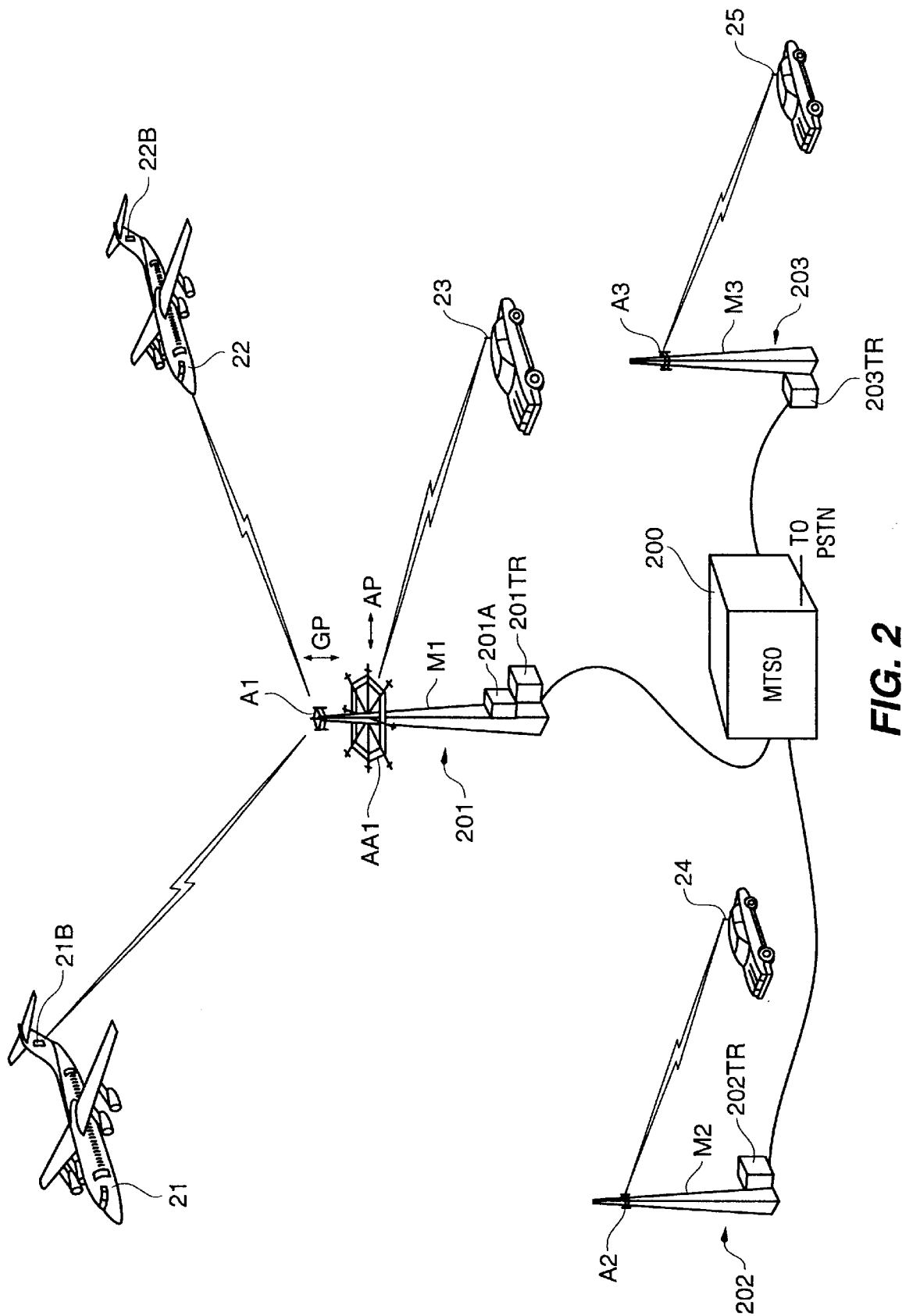
FIG. 2 illustrates in block diagram view, the overall architecture of the multidimensional cellular telecommunication network of the present invention.

The multidimensional cellular mobile telecommunication network of the present invention is illustrated in block diagram form in FIG. 2. This diagram illustrates the basic concepts of the multidimensional cellular mobile telecommunication network and, for the purpose of simplicity of illustration, does not comprise all of the elements found in a typical network. The fundamental elements disclosed in FIG. 2 provide a teaching of the interrelationship of the various elements which are used to implement a multidimensional cellular mobile telecommunication network.

The basic ground-based cellular telecommunication network of the prior art is incorporated into this system to enable the non-terrestrial mobile subscriber stations to be integrated into the existing service structure. In particular, the mobile telecommunication switching office 200 serves to interconnect a plurality of ground-based cells 201, 202, 203 with the public switched telephone network (PSTN), as noted above. The ground-based cells 201, 202, 203 each include a transmitter-receiver pair 201TR, 202TR, 203TR and an antenna complex, which typically comprises a tower M1, M2, M3 to which is affixed one or more antenna elements A1, A2, A3, respectively.

Existing cellular mobile telecommunication systems use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation. The antenna structure used in ground-based mobile cellular telecommunications is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth's surface. The receiver antenna has characteristics that are analogous to that of the transmitter antenna. The polarization of these signals is horizontal in nature, shown by arrow GP in FIG. 2.

The mobile telecommunication switching office MTSO is partitionable via software to divide the physical area covered by the cells into two or more segments, one of which segments can optionally overly another segment. Typically, in ground-based cellular telecommunication systems, the available channels are divided between two competing cellular carriers so that the service area is served by the two carriers. However, this partition ability enables the multidimensional mobile cellular telecommunication network to create a virtual cell network of non-terrestrial cells which coexists with the existing ground-based mobile cellular telecommunication network. This virtual cell network works with multiple existing ground-based mobile cellular telecommunication systems, different equipment, different vendors, different frequencies, can even be different technologies: digital/analog or TDMA/CDMA or FM/AM/PSK. The multidimensional mobile cellular telecommunication network is seamless and overlaid on existing ground-based cellular telecommunication network.

The multidimensional cellular mobile telecommunication network adds to the existing mobile cellular telecommunication network one or more non-terrestrial cells. A non-terrestrial cell is defined as an installation which is equipped with at least one non-terrestrial cell site transmitter-receiver pair, such as 201A and an associated antenna AA1 for receiving and transmitting cellular telecommunication transmissions to and from non-terrestrial mobile subscriber stations, such as aircraft 21, 22, which are equipped with mobile subscriber station apparatus 21B, 22B. The non-terrestrial transmitter-receiver pair 201A is interconnected to the public switched telephone network PSTN via the mobile telecommunication switching office MTSO. The non-terrestrial cell site antenna Ml has a radio signal radiation pattern which is directed above a horizontal plane encompassing the antenna. The majority of the radiated radio signal is directed at angles above the horizontal plane, which angles are typically greater than 4° in magnitude to avoid interference with ground-based mobile cellular telephone stations 23, 24, 25. In addition, the polarization of these radio signals is selected to be substantially orthogonal to the polarization of the radio signals emanating from the ground-based antennas, and is typically vertically polarized, as shown by arrow AP in FIG. 2.

The non-terrestrial cell site transmitter-receiver pair 201A can be integrated with an existing ground-based cell site transmitter-receiver pair, in that there is some sharing of equipment which mounts the antenna elements on a common tower M1 and/or interconnects both cell site transmitter-receiver pairs to the public switched telephone network PSTN. In the embodiment of FIG. 2, the non-terrestrial cell site antenna elements AA1 are mounted on the same tower M1 as the antenna elements A1 used to implement the ground-based cell site.

Multidimensional Cellular System Implementation Issues

Figure 3:
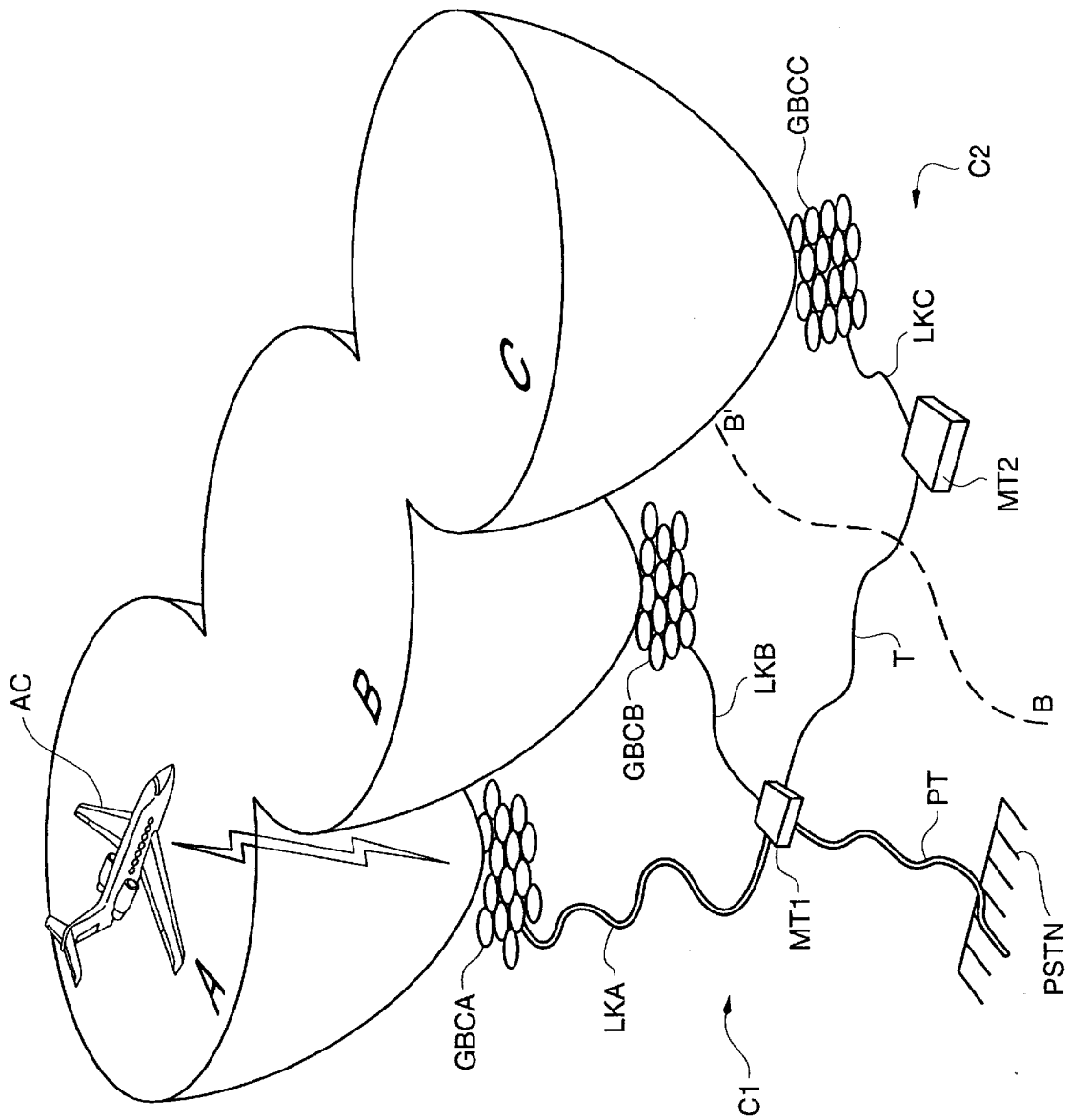
FIGS. 3–5 illustrate perspective views of a multi-cell non-terrestrial cellular mobile telecommunication system as well as the relative geographical extent of the ground-based cells and typical non-terrestrial cells.
Figure 4:
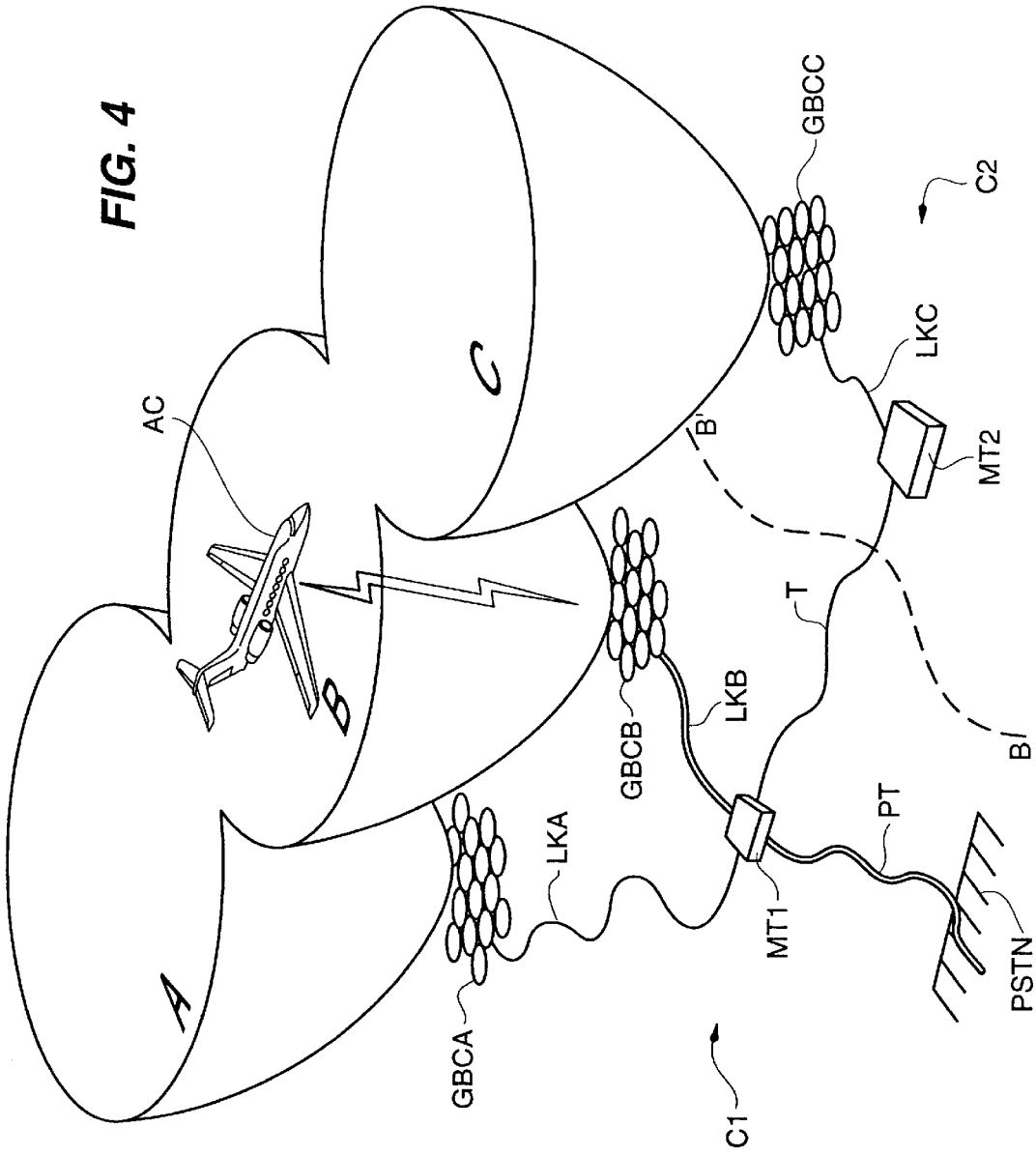
Figure 5:
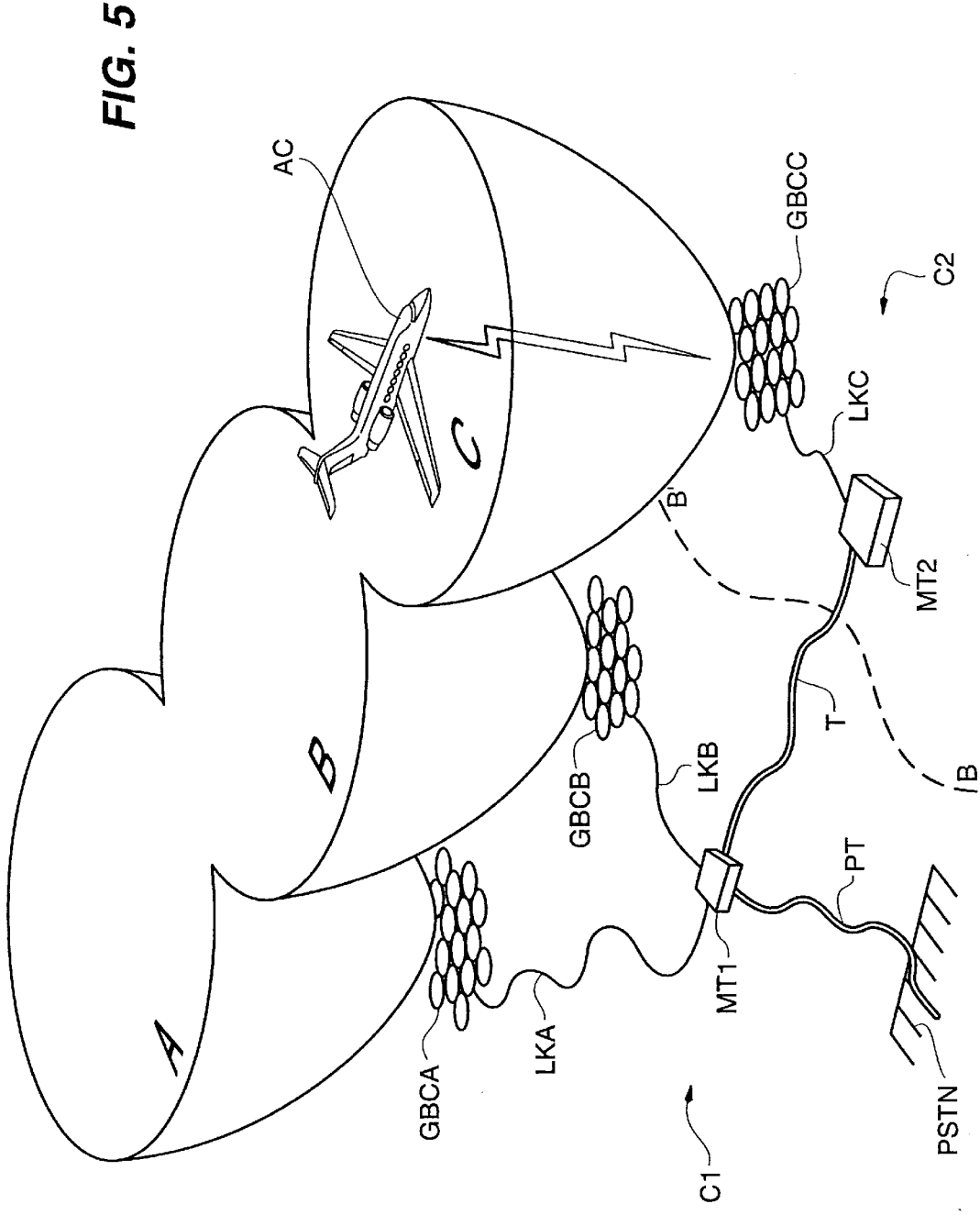
Figure 6:
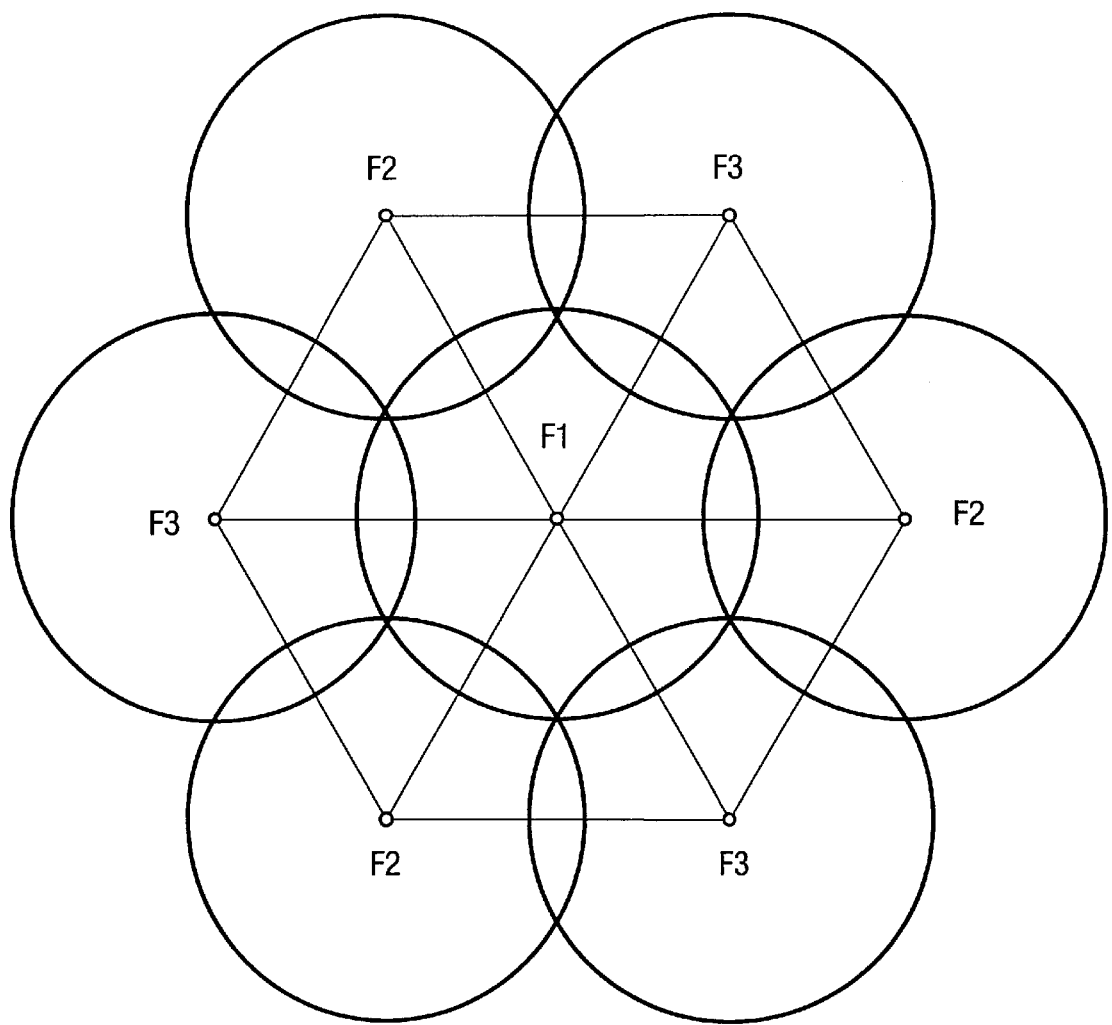
FIG. 6 illustrates a diagram of a typical non-terrestrial cell frequency reuse pattern.

In a multidimensional cellular mobile telecommunication system, a problem with the architecture illustrated in FIG. 2 is that the frequencies allocated for cellular mobile telecommunications for ground-based mobile subscriber stations are the same as those allocated for non-terrestrial mobile subscriber stations. The selection of broadcast frequencies for the plurality of ground-based cells is ordered to ensure that there is never an occurrence of adjacent cells broadcasting on the same frequency. There is an industry standard pattern of frequency allocation for cells and this industry standard pattern does not encompass non-terrestrial cells. A complicating factor is that a non-terrestrial cell has an extent significantly greater than a ground-based cell. In particular, the ground-based cells make use of antennas mounted on a tower which is located at a site which provides typically the greatest elevation in the cell so that the broadcast pattern of the antenna covers the greatest possible area. Given that the ground-based cell site transmitter is broadcasting toward the ground from its physical location, the extent of the cell is limited by the elevation of the antenna and any intervening physical signal obscuring features in the cell, such as buildings, mountains or the like. This limitation is not present for non-terrestrial antennas which broadcast in a skyward direction and do not have a limited broadcast range in terms of intervening features. FIGS. 3–5 illustrate a perspective view (not to scale) of the relative geographical extent of the ground-based cells and three typical non-terrestrial cells A–C. The non-terrestrial cell site antenna pattern is typically substantially parabolic in shape and covers a line of sight range from the siting of the antenna to the physical horizon. Therefore, the antenna pattern for the non-terrestrial cell covers a significantly greater area than a typical ground-based cell. Thus, a non-terrestrial cell typically covers tens or even hundreds of ground-based cells and is adjacent to ground-based cells that broadcast at every one of the presently allocated frequencies for cellular mobile telecommunications. Thus, by the very nature of this overlap, the non-terrestrial cell has a broadcast frequency which matches that of at least one of the juxtaposed ground-based cells. Furthermore, the frequency reuse pattern for non-terrestrial cells must be such that adjacent non-terrestrial cells do not use the same broadcast frequency. FIG. 6 illustrates a typical frequency reuse pattern for non-terrestrial cells. The extent of each non-terrestrial cell enables the frequency reuse pattern to be simpler than that used for ground-based cells. Since the frequency reuse pattern requires only a small subset of the presently allocated frequencies, the reuse pattern can be used to create a cell within a cell. The traffic handling capacity of a particular non-terrestrial cell can therefore be doubled by simply allocating twice the frequencies for this cell, creating two cells having substantially the same physical extent. Thus, there is far greater flexibility in the non-terrestrial cells than in the corresponding ground-based cells in terms of cell implementation and management as is evidenced in additional detail by the following description of the system.

In order for the non-terrestrial cells to make use of the frequencies that are allocated for the ground-based mobile telecommunication cells, there must be some method of ensuring that the signals broadcast to and from the non-terrestrial mobile subscriber stations do not interfere with the existing communications in the ground-based cells and their ground-based mobile subscriber stations. To eliminate interference between non-terrestrial communications and ground-based communications for mobile cellular customers, the transmit and receive antenna patterns are architected to reduce the overlap in their area of coverage, as noted above. In addition, the polarization of the non-terrestrial transmissions are selected to be substantially orthogonal to the polarization of the ground-based transmissions. Alternatively, the non-terrestrial cellular telecommunication system can switch the uplink and downlink frequencies to be the opposite of the ground-based mobile subscriber station pattern. The presently used forward link can be used as the reverse link and the presently used reverse link can be used as the forward link in the non-terrestrial mobile subscriber station application. The transmitter power for the non-terrestrial mobile subscriber stations is significantly reduced over that used by ground-based mobile subscriber stations. A final element of the implementation that prevents communication overlap is the use of dedicated control channels for the non-terrestrial communications, which control channels are not recognized by the ground-based communications. These factors individually and in various combinations enable the non-terrestrial communications to operate on frequencies that are used for ground-based communications where the non-terrestrial cells overlap the ground-based cells using the same transmit and receive frequencies. Other design factors of the same genre are possible and can include shifting the transmit and receive frequencies to be located between the existing predefined frequencies, and the like.

In operation, the multidimensional cellular mobile telecommunication system can comprise a separate non-terrestrial cellular mobile telecommunication system which can be integrated with the existing ground-based cellular mobile telecommunication system via a well defined interface. FIGS. 3–5 illustrate the operation of the multidimensional cellular mobile telecommunication system in a typical call processing situation. In FIG. 3, the non-terrestrial mobile subscriber station comprises an aircraft AC which is located in non-terrestrial cell A, which non-terrestrial cell overlays a plurality of ground-based cells GBCA. Two additional non-terrestrial cells B, C are also shown, each of which overlays another plurality of ground-based cells GBCB, GBCC, respectively. The three non-terrestrial cells A–C are shown as being oriented adjacent to each other, with cell B being between cells A and C. It is typical that other non-terrestrial cells would be implemented adjacent to cells A–C to provide complete coverage of the non-terrestrial space that extends above the ground shown in FIGS. 3–5. For simplicity of description, only three non-terrestrial cells A–C are shown in these figures. The existing ground-based cells are each connected via trunks LKA-LKC to an associated mobile telecommunication switching office MT1, MT2, which are themselves connected together via trunk T and to public switched telephone network PSTN via trunks PT. In this environment, it is typical that two different providers are serving the network, with a first company serving region C1 and a second company serving region C2, with the dividing line between the two service areas being shown in the figures by the dashed line B–B'. In this system environment, a call is established from a subscriber located in the aircraft AC, using a mobile subscriber station apparatus located in the aircraft AC in the well known manner of the existing ground-based cellular systems. The control signals from the mobile subscriber station apparatus located in the aircraft AC are transmitted to the cell site transmitter-receiver pair of non-terrestrial cell A, which is served by the first cellular company which provides service in region C1. The call is connected via trunk LKA to the mobile telecommunication switching office MT1, which interconnects the call connection to the public switched telephone network PSTN via trunk PT, in well known fashion. The call connection is then extended to the designated subscriber (not shown) which is assumed for this description to be located at a "land line" station. The allocation of frequencies and the subscriber identification for aircraft AC is managed via the non-terrestrial cell site control software which operates independent of the ground-based cellular network and which can be operational in the mobile telecommunication switching office MT1 which serves the non-terrestrial cell site for non-terrestrial cell A.

The diagram of FIG. 4 illustrates the instance of the aircraft AC traversing the boundary of non-terrestrial cell A into the extent of non-terrestrial cell B. Since non-terrestrial cell B is also supported by the first provider in service region C1, the handoff between adjacent non-terrestrial cells can be accomplished in the traditional manner, with the non-terrestrial cells surrounding the non-terrestrial cell in which the non-terrestrial subscriber station (aircraft AC) is presently active (non-terrestrial cell A) signal the aircraft AC to ascertain which non-terrestrial cell provides the signal of greatest magnitude, and is therefore the candidate for handoff. The call connection is identified as a non-terrestrial call and is therefore managed by mobile telecommunication switching office MT1 as disjunct from the ground-based calls and the handoff to non-terrestrial cell B is processed in well known fashion with the mobile telecommunication switching office MT1 managing the non-terrestrial cells surrounding cell A as a virtual network, which is disjunct from the ground-based mobile cellular telecommunication network of GBCA and GBCB. Thus, the call connection to the aircraft AC via link LKA is transferred to link LKB as the frequency pair for communication with the aircraft AC is simultaneously switched to match that of the new cell, non-terrestrial cell B.

The diagram of FIG. 5 illustrates the instance of the aircraft AC traversing the boundary of non-terrestrial cell B into the extent of non-terrestrial cell C. Since non-terrestrial cell C is not supported by the first provider in service region C1, the handoff between adjacent non-terrestrial cells is still accomplished in the traditional manner, with the non-terrestrial cells surrounding the non-terrestrial cell in which the non-terrestrial subscriber station (aircraft AC) is presently active (non-terrestrial cell B) signal the aircraft AC to ascertain which non-terrestrial cell provides the signal of greatest magnitude, and is therefore the candidate for handoff. The call connection is identified as a non-terrestrial call and is therefore managed by mobile telecommunication switching office MT1 as disjunct from the ground-based calls and the handoff to non-terrestrial cell C is managed in well known fashion. In particular, the call connection is switched from mobile telecommunication switching office MT1 to mobile telecommunication switching office MT2 concurrent with the radio frequency handoff between the adjacent non-terrestrial cells B and C and the link to the public switched telephone network PSTN is maintained via trunk T so that there is no interruption in the call connection. Thus, aircraft AC switches the frequency pair for communication with the non-terrestrial cell C simultaneously with the ground-based link being switched to a communication path comprising link LKC to mobile telecommunication switching office MT2, trunk T, mobile telecommunication switching office MT1, and trunk PT to the public switched telecommunication network PSTN.

Non-Terrestrial Cell Configuration

The non-terrestrial cell typically shares a locus with a ground-based cell for efficiency purposes and produces an antenna pattern that is juxtaposed to the ground-based cell site antenna pattern and relatively non-overlapping so that transmissions are directed to non-terrestrial mobile subscriber stations rather than including ground-based mobile subscriber stations in the antenna pattern. The non-terrestrial cells can optionally each have a unique HLR and SID designation to distinguish them from the ground-based cells and to enable them to be managed in call origination, establishment and handoff functions.

Figure 7:
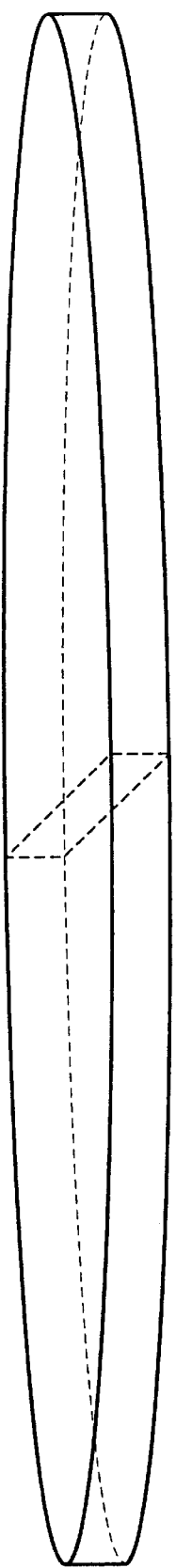
FIG. 7 illustrates a sectored non-terrestrial cell with a substantially cylindrical antenna pattern configuration.
Figure 8:
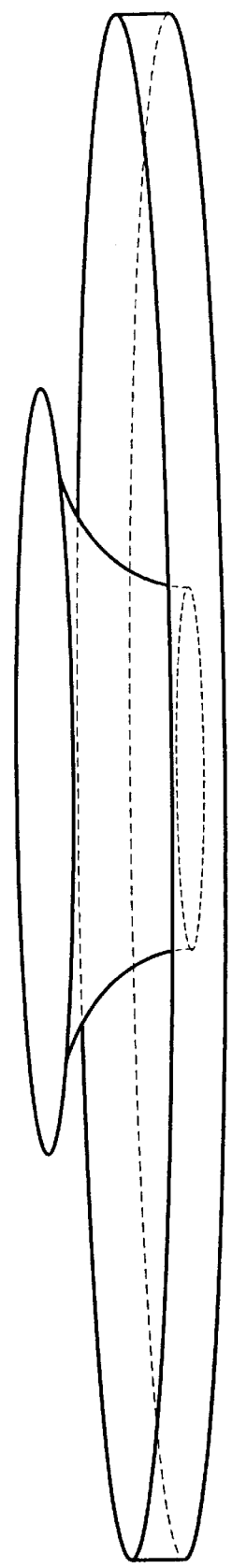
FIG. 8 illustrates a sectored non-terrestrial cell with a substantially toroidal antenna pattern configuration which includes a cylindrical antenna pattern configuration nested within the aperture of the toroid.

The non-terrestrial cell site antenna pattern can encompass a single cell element or multiple cell elements, depending on the implementation of the various antenna elements and several variations of the antenna pattern are disclosed herein. A simple single cell site pattern can comprise a substantially cylindrical or paraboloid pattern which extends radially out from the antenna in all directions above a plane substantially coplanar to the Earth's surface and at an elevation corresponding to the antenna mounting on the mast. This antenna pattern encompasses all of the volume of space located within line of sight of the antenna site, as is shown in FIG. 3. Alternatively, the antenna pattern can be divided into a plurality of segments for use as subcells or independent cells within the area noted above. In particular, it may be beneficial to bifurcate the cylindrical area into two segments along a vertically oriented plane which is aligned with a diameter of the circle which comprises the bottom base of the cell, as shown in FIG. 7. This antenna pattern enables the non-terrestrial cellular mobile telecommunication system to manage communications in one half of the cell independent of the other half of the cell. This pattern also enables the antenna characteristics to be optimized for the respective directions of transmission which may provide efficiency in obtaining a more uniform antenna pattern for each of the two smaller regions of coverage. Another possible pattern of coverage for the non-terrestrial antennas is illustrated in FIG. 8 with the creation of a substantially toroidal antenna pattern with a second pattern occupying a central hole in the toroid and extending upward in a substantially conical manner. These two antenna patterns can be managed as a single cell or can comprise two separate and independent cells. Alternatively, the toroidal section can be divided into two or more segments and managed as separate cell elements. Thus, it is evident from this description, that the non-terrestrial cells have greater flexibility of implementation than the ground-based cells and comprise at least one cell within a predetermined three-dimensional volume of space. Thus, the control software can implement a soft handoff within a single cell, and a hard handoff between adjacent non-terrestrial cells. The hard handoffs switch frequencies while the soft handoffs do not, and in the hard handoff, it is determined by the mobile telephone switching office while the soft handoff is determined by the transmitter controller.

Multidimensional Cellular Antenna Characteristics

Figure 9:
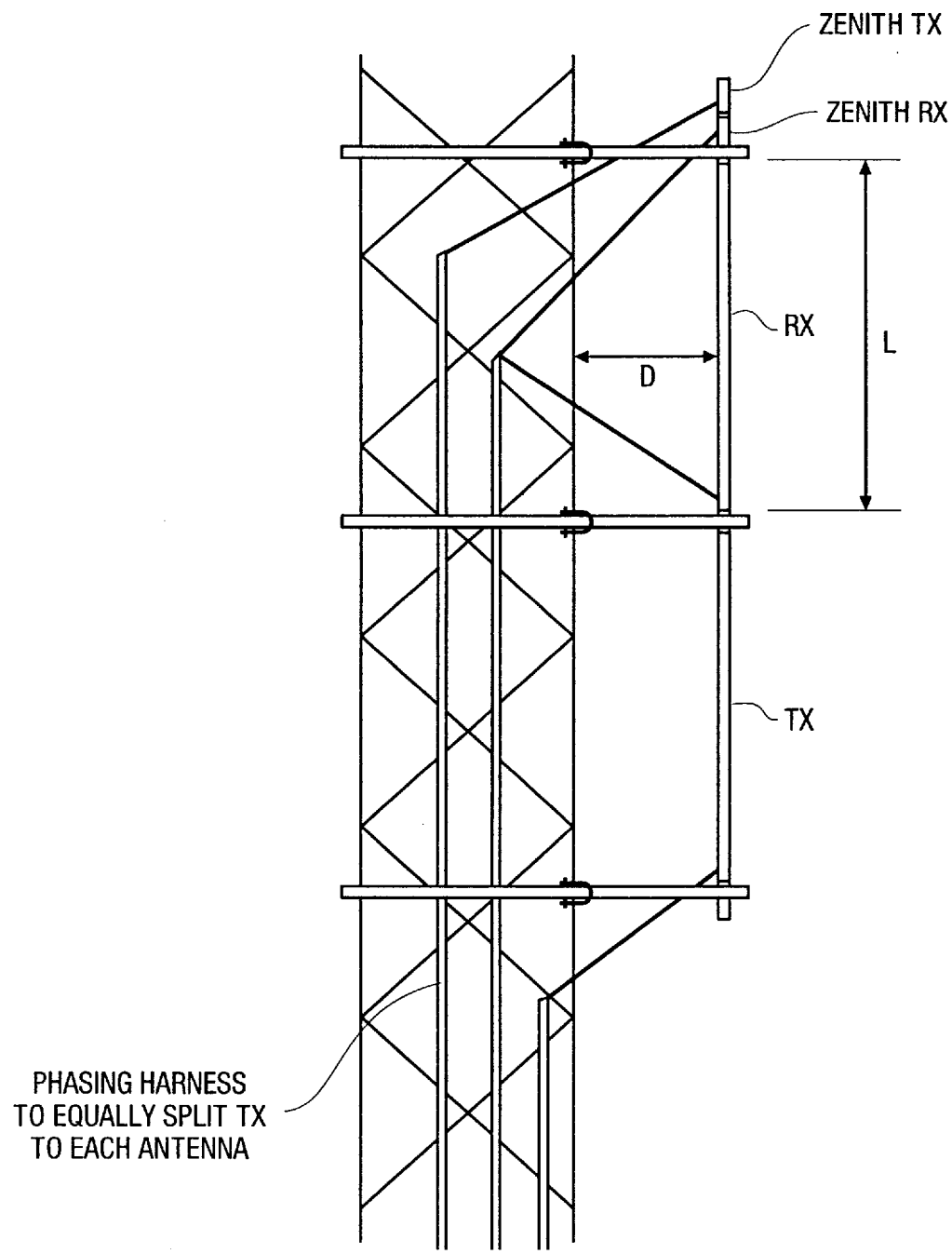
FIG. 9 illustrates a typical antenna mounting arrangement.

The antenna located on a ground-based mobile subscriber station, such as an automobile, truck or boat, is vertically polarized and the antenna located on the ground-based station is likewise vertically polarized to provide more efficient coupling between the antennas. A different polarization between these antennas would have a marked effect on the effectiveness of the transmissions between the antennas. The ground-based antenna is mounted as high as practical since the coverage is a function of antenna elevation. The non-terrestrial antenna points skyward and therefore mounting height is far less relevant. The non-terrestrial antenna can be mounted below the ground-based antenna as shown in FIG. 2 or above the ground-based antenna. Non-terrestrial subscriber stations, such as aircraft, receive noise signals from ground-based sources, while in the reverse signal direction, the non-terrestrial cell site receiver does not receive signals from many noise sources since the only active sources of radio signals in the non-terrestrial region are the non-terrestrial subscriber stations. As noted above, the polarization of the non-terrestrial antenna elements should be substantially orthogonal to the polarization of the ground-based antenna elements. Therefore, the non-terrestrial antenna elements are horizontally polarized. The tower on which the antenna elements are mounted is largely transparent to the horizontally polarized non-terrestrial antenna radio frequency transmissions since the polarization of the signals is horizontal in nature and the tower is vertically oriented. In addition, the tower braces are diagonal in their orientation and therefore do not represent a substantial source of interference. The preferred implementation of the non-terrestrial antenna elements is shown in FIG. 9 and comprise a slotted waveguide antenna element with an optional associated zenithally oriented antenna element for both the receive antenna elements as well as the transmit antenna elements. The slotted waveguide antenna element produces the toroidal pattern illustrated in FIG. 8, while the zenithally oriented antenna element produces the substantially cylindrical pattern located in the hole in the torus. The zenithally oriented antenna element can be any of a number of typical antenna elements, including, but not limited to: dipole, folded dipole, helix, Yagi and the like. The helix antenna provides a benefit in that the antenna pattern produced by such an element is circularly polarized and therefore is relatively insensitive to the direction of movement of the non-terrestrial subscriber station as the non-terrestrial subscriber station traverses the area near to and above the antenna. In the implementation illustrated in FIG. 9, for the cellular radio frequencies, the slotted waveguide antenna element is preferably mounted on to the existing antenna tower which is used to support the antenna for ground-based cells. As shown in FIG. 9, the antenna elements are mounted a sufficient distance D from the tower to reduce interference.

A slotted waveguide antenna consists of a length L of waveguide that is constructed to implement a multi-element antenna which produces a focused receive pattern. Typically, the receive pattern of the slotted waveguide antenna is formed to receive signals from only a segment of space (controlled field of view), with the precise receive pattern being created by management of the size, location and geometry of the slots cut into the waveguide. A slot cut into the waveguide wall is connected to the conductors of a twin line feed, placed in the interior of the slotted waveguide. The waveguide slots emit power received from the twin line feed into free space. The spacing and/or orientation of the slots along the edge of the waveguide are used in order to control aperture illumination. The slotted waveguide antenna can be mechanically tilted or the produced antenna pattern electrically steered to provide a predetermined amount of uptilt to the antenna pattern, which uptilt reduces the production of multi-path interference signals as described below.

In the embodiment disclosed herein, the shaped beam pattern encompasses the volume of space located above and radially around the antenna elements which are mounted on the antenna tower. The antenna can comprise either a single, or multiple antenna elements, which are designed to produce a receive characteristic pattern which provides substantially uniform coverage for the entire non-terrestrial cell. In particular, the antenna pattern covers the region of space above an antenna horizon, which antenna horizon extends radially from the antenna mast to the physical horizon, and at the elevation which substantially corresponds to the antenna element mounting height on the antenna tower. As a practical implementation, the antenna is mounted with a slight (typically 4°) uptilt to minimize the production of multi-path signals. The antenna criteria are also: a horizontally polarized beam to match the non-terrestrial subscriber station transmitter signal polarization, and a beam pattern which exhibits a sharp reduction in gain for elevation angles below the antenna horizon.

Figure 11:
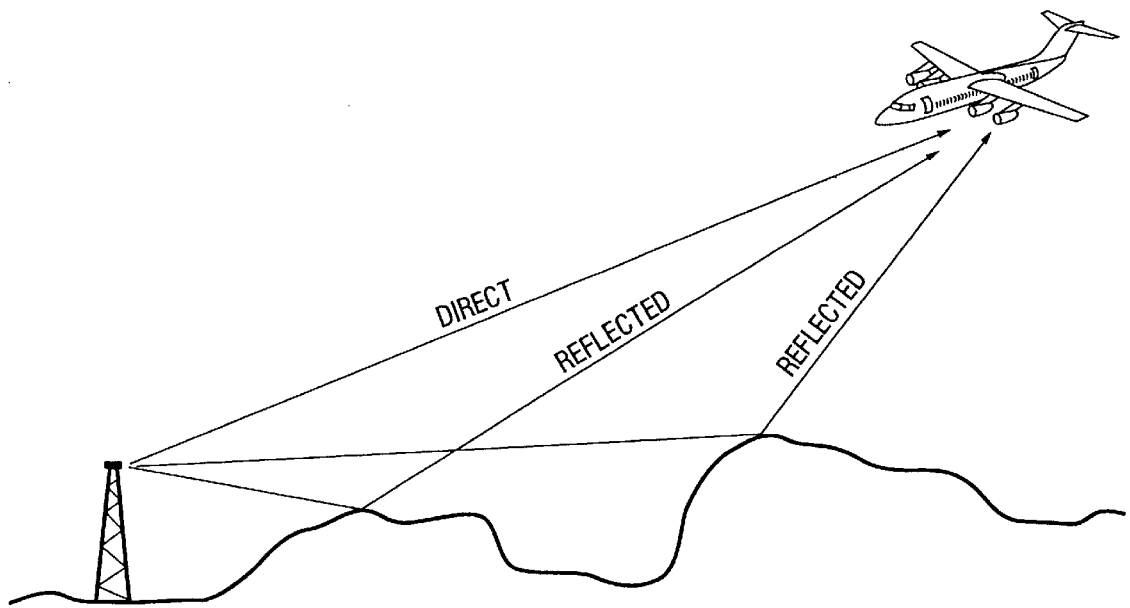
FIG. 11 illustrates the signal paths that are found in the multipath interference situation.

The reduction of the ground reflections of signals is important due to the multi-path phenomena. Multi-path is illustrated in FIG. 11 wherein the signals produced by a transmitting source reach the receiver over many different paths, including direct reception of the generated signals and multi-path reception of the generated signals due to reflections from the ground surface. When the path length of the various signal paths are integral wavelength multiples of the fundamental wavelength, this causes nulls which repeat in a fixed pattern, thereby causing reduction in signal power at these points. The antenna uptilt used in the non-terrestrial antenna reduces these nulls by reducing the energy illumination of the ground.

Non-Terrestrial Mobile Subscriber Stations

In the above description of the multidimensional cellular communication system, the non-terrestrial mobile subscriber stations are assumed for the purpose of the description to be a small fixed wing aircraft. However, the nature of the mobile unit in which the mobile subscriber station is installed is not limited to this application. In particular, the mobile unit can be a lighter than air craft, a helicopter, or a commercial multipassenger fixed wing aircraft, or the like. The only limiting factor is that the mobile unit is operational in the non-terrestrial cells rather than the ground-based cells when a communication connection is established. A specific exception to this general rule is that a non-terrestrial cell can be established at, for example, an airport location to serve the aircraft located on the ground prior to the aircraft taking off and entering the non-terrestrial cell extant in the region of space above the airport. This "ground-based" non-terrestrial cell can operate on a low power basis, since the transmit range can be limited to the bounds of the airport, thereby avoiding interference with the adjacent non-terrestrial cells.

The mobile unit is typically equipped with an electronics unit which includes the transmitter, receiver and control circuits well known in cellular communications. The apparatus also includes an antenna, which is typically mounted on the exterior surface of the mobile unit. The antenna mounting can be directly fixed to the mobile unit or can be located in a separate unit which is mounted on the exterior surface of the mobile unit. In this latter case, the antenna can be mechanically steered so that the radiation pattern of the antenna elements can be aligned with the cell site transmitter and receiver antennas to thereby enhance the quality of the communication therebetween. Alternatively, the antenna can be electronically steered by adjusting the phase and/or magnitude of the signals applied to the antenna elements of an array as is well known in this technology. The power output of the non-terrestrial transmitters can also be regulated as a function of the distance from the cell site transmitter antenna to ensure a relatively constant signal level.

Furthermore, the transmitter, receiver and control circuits may be used to serve a single handset unit or can be multiplexed to serve a plurality of handset units as in a commercial airliner application. The handsets can be hard wired to the electronics unit or can be wireless units of limited communication range which interconnect with the electronics unit via radio frequency transmissions. In the multi-user application, the electronics unit can comprise a "mini-cell" wherein the various handsets are managed by the electronics unit in a manner analogous to that performed by the typical cell site/MTSO. Thus, the handset units can be of a different technology than the single handset applications, with the electronic unit performing an integration function as well as the multiplexing function. The handsets can be personal communication system (PCS) units, pagers, code division multiple access (CDMA) units, or any other wireless communication devices which are in use by individuals. The electronics unit receives the signals generated by the various handset units and formats (if necessary) the data contained in these transmissions into the format used for the radio link transmissions to the cell site. The resultant signal is applied via the transmitter contained in the electronics unit to the antenna mounted on the exterior of the mobile unit, which radiates the signals to the serving cell site. The communications in the reverse direction are managed in a complementary manner as is well known. The handset units each have a unique identification which enables the underlying cellular communication network to communicate with the unit. The electronics unit can therefore perform the handset registration function by polling the handset units extant in the space served by the electronics unit to thereby identify these units. This unit identification data can then be transmitted to the cell site via the control channels to enable the cellular network to ascertain the location of these particular units. Thus, when a ground-based subscriber (for example) initiates a call to one of these handset units, the MSTO can scan the mobile subscriber records to locate the identified mobile subscriber station. This data is then used by the cellular network to establish a communication link to the identified mobile subscriber unit. In this manner, what may traditionally may be considered ground-based mobile subscriber stations can function as non-terrestrial subscriber stations in the environment just described.

SUMMARY

The multidimensional cellular mobile telecommunications system extends the usage of existing cellular mobile telecommunication frequencies allocated for ground-based communications to non-terrestrial mobile subscriber stations by adding an overlay of non-terrestrial cells of predetermined geometry and locus in space to the existing ground-based cellular cell site network. The polarization of the signals produced by the non-terrestrial antenna elements is substantially orthogonal to the polarization of the ground-based antenna signals to thereby minimize the possibility of interference with the vertically polarized ground-based signals. Furthermore, the control signals exchanged between the non-terrestrial mobile subscriber stations and the cell site controller are architected to avoid the possibility of interference with ground-based cell site transmitter-receiver pairs. In this manner, the existing two dimension mobile cellular telecommunication network is extensible by use of these novel methods and apparatus to create a multidimensional cellular mobile telecommunication system which makes use of the presently allocated frequencies and presently provided services.

What is claimed:

1. A cellular mobile telecommunication system for providing radio communication with both ground-based and non-terrestrial mobile telecommunication stations using radio frequencies allocated for ground-based mobile telecommunication stations, comprising:
   at least one radio transmitter for generating a plurality of telecommunication cells, each having three-dimensional extent, arranged in at least three dimensions, with communication signals generated by said at least one transmitter being at wavelengths allocated for ground-based mobile telecommunication stations, with a first subset of said plurality of telecommunication cells being ground-based cells located juxtaposed to the earth surface for serving ground-based mobile telecommunication stations, with a second subset of said plurality of telecommunication cells being non-terrestrial cells, serving non-terrestrial mobile telecommunication stations; and
   at least one radio receiver for receiving communication signals generated by mobile telecommunication stations extant in said plurality of telecommunication cells.

2. The system of claim 1 wherein said at least one transmitter generates signals for transmission into said non-terrestrial cells, which generated signals are polarized substantially orthogonal to signals generated by said at least one transmitter for transmission into said ground-based cells.

3. The system of claim 2 wherein said signals generated by said at least one transmitter for transmission into said ground-based cells are vertically polarized and said signals generated by said at least one transmitter for transmission into said non-terrestrial cells are horizontally polarized.

4. The system of claim 1 wherein said non-terrestrial cells are substantially parabolic in shape.

5. The system of claim 1 wherein said non-terrestrial cells are substantially cylindrical in shape.

6. The system of claim 1 wherein said non-terrestrial cells are substantially toroidal in shape, inclusive of a cylindrical sector located in the center of the torrus.

7. The system of claim 1 wherein said non-terrestrial cells are each juxtaposed to and overlying a plurality of said ground-based cells.

8. The system of claim 1 wherein said at least one radio transmitter comprises:

at least one antenna tower;

non-terrestrial antenna means, mounted on said at least one antenna tower, having an antenna characteristic pattern which points skyward, and ground-based antenna means, mounted on said at least one antenna tower and substantially collocated with said non-terrestrial antenna means, having an antenna characteristic pattern which points downward from its point of mounting on said at least one antenna tower; and wherein said non-terrestrial antenna means is operable to reject signals reflected from the surface of the earth as well as signals originating from below a horizon of said non-terrestrial antenna means.

9. The system of claim 8 wherein said non-terrestrial antenna means comprises a nonscanning directional antenna for forming a shaped pattern beam to receive signals generated by mobile subscriber stations extant in a one of said non-terrestrial cells served by said non-terrestrial antenna means and to reject signals reflected from the surface of the earth as well as signals originating from below a horizon of said non-terrestrial antenna means.

10. The system of claim 9 wherein said non-terrestrial antenna means exhibits high gain in said one non-terrestrial cell and low gain elsewhere.

11. The system of claim 9 wherein said non-terrestrial antenna means comprises a slotted waveguide antenna.

12. The system of claim 1 wherein said at least one transmitter generates signals which comprise a communication space, which communication space is divided into control channels and communication channels, with control channels for non-terrestrial cells selected to correspond to communication channels for ground-based cells.

13. The system of claim 12 wherein said at least one receiver comprises:

first receiver means operational to receive signals transmitted by ground-based subscriber stations extant in a ground-based cell served by said first receiver means; and second receiver means operational to receive signals transmitted by non-terrestrial subscriber stations extant in a non-terrestrial cell served by said second receiver means.

14. The system of claim 13 wherein said first receiver means fails to decode control signals transmitted by non-terrestrial subscriber stations in control channels for non-terrestrial cells, which control channels are selected to correspond to communication channels for ground-based cells.

15. The system of claim 13 wherein said second receiver means fails to decode control signals transmitted by ground-based subscriber stations in control channels for ground-based cells, which control channels are selected to correspond to communication channels for non-terrestrial cells.

16. The system of claim 1 wherein said at least one transmitter generates signals which comprise a communication space, which communication space is divided into control channels and communication channels, a subset of said channels being dedicated for non-terrestrial cells, a first group of said subset being control channels and remaining channels in said subset being communication channels.

17. In a cellular mobile telecommunication system, a method for providing radio communication with both ground-based and non-terrestrial mobile telecommunication stations using radio frequencies allocated for ground-based mobile telecommunication stations, comprising the steps of:

generating, at at least one radio transmitter, a plurality of telecommunication cells, each having three-dimensional extent, arranged in at least three dimensions, with communication signals generated by said at least one transmitter being at wavelengths allocated for ground-based mobile telecommunication stations, with a first subset of said plurality of telecommunication cells being ground-based cells located juxtaposed to the earth surface for serving ground-based mobile telecommunication stations, with a second subset of said plurality of telecommunication cells being non-terrestrial cells, serving only non-terrestrial mobile telecommunication stations; and receiving, at at least one radio receiver, communication signals generated by mobile telecommunication stations extant in said plurality of telecommunication cells.

18. The method of claim 17 further comprising:

generating, at said at least one transmitter, signals for transmission into said non-terrestrial cells, which generated signals are polarized substantially orthogonal to signals generated by said at least one transmitter for transmission into said ground-based cells.

19. The method of claim 18 further comprising:

generating, at said at least one transmitter, vertically polarized signals for transmission into said ground-based cells; and generating, at said at least one transmitter, horizontally polarized signals for transmission into said non-terrestrial cells.

20. The method of claim 17 further comprising:

overlying said non-terrestrial cells on a plurality of said ground-based cells.

21. The method of claim 17 wherein said at least one radio transmitter comprises at least one antenna tower, and wherein said at least one transmitter generates signals which comprise a communication space, further comprising:

mounting a non-terrestrial antenna on said at least one antenna tower, which non-terrestrial antenna has an antenna characteristic pattern which Points skyward;

mounting a ground-based antenna on said at least one antenna tower, substantially collocated with said non-terrestrial antenna, which ground-based antenna has an antenna characteristic pattern which points downward from its point of mounting on said at least one antenna tower; and dividing said communication space into control channels and communication channels, with control channels for non-terrestrial cells selected to correspond to communication channels for ground-based cells.

22. The method of claim 21 wherein said at least one receiver comprises first and second receivers, said method comprising:

operating said first receiver to receive signals transmitted by ground-based subscriber stations extant in a ground-based cell served by said first receiver; and operating said second receiver to receive signals transmitted by non-terrestrial subscriber stations extant in a non-terrestrial cell served by said second receiver.

23. The method of claim 22 wherein said method further comprises:

operating said first receiver in a manner to fail to decode control signals transmitted by non-terrestrial subscriber stations in control channels for non-terrestrial cells, which control channels are selected to correspond to communication channels for ground-based cells.

24. The method of claim 22 wherein said method further comprises:

operating said second receiver in a manner to fail to decode control signals transmitted by ground-based subscriber stations in control channels for ground-based cells, which control channels are selected to correspond to communication channels for non-terrestrial cells.

25. The method of claim 17 further comprising:

operating said at least one transmitter to generate signals which comprise a communication space, which communication space is divided into control channels and communication channels, a subset of said channels being dedicated for non-terrestrial cells, a first group of said subset being control channels and remaining channels in said subset being communication channels.

* * * * *